(12) United States Patent
Ward, Jr.

(10) Patent No.: US 9,195,484 B1
(45) Date of Patent: Nov. 24, 2015

(54) DYNAMIC LOGICAL ZONE ASSIGNMENT

(71) Applicant: Amazon Technologies, Inc., Reno, NV (US)

(72) Inventor: David John Ward, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 217 days.

(21) Appl. No.: 13/795,287

(22) Filed: Mar. 12, 2013

(51) Int. Cl.
*G06F 9/455* (2006.01)
*G06F 9/46* (2006.01)
*G06F 9/48* (2006.01)

(52) U.S. Cl.
CPC ............ *G06F 9/455* (2013.01); *G06F 9/45533* (2013.01); *G06F 9/4806* (2013.01); *G06F 9/4881* (2013.01)

(58) Field of Classification Search
CPC .. G06F 9/45533; G06F 9/4881; G06F 9/4806
See application file for complete search history.

(56) References Cited

U.S. PATENT DOCUMENTS 8,595,379 B1 * 11/2013 Brandwine ................ 709/244
2009/0307690 A1 * 12/2009 Logan et al. .................. 718/1

* cited by examiner

*Primary Examiner* — Camquy Truong
(74) *Attorney, Agent, or Firm* — Baker & Hostetler LLP

(57) ABSTRACT

Techniques are disclosed for dynamic assignment of a logical zone to a data center. A request may be received to link together different accounts. Data center selection information may then be obtained including, for example, an identification of the data centers to which each of the linked accounts is currently assigned, linked account usage information and system capacity information. The obtained information may be used to determine a selected data center to which to assign the logical zone across each of the linked accounts. The selected data center may be determined based on one or more selection priorities, which may be set based on input from any combination of a customer, a service provider and/or another party. Any linked accounts not currently assigned to the selected data center may then have instances migrated to the selected data center using, for example, one or more passive and/or active migration techniques.

23 Claims, 17 Drawing Sheets

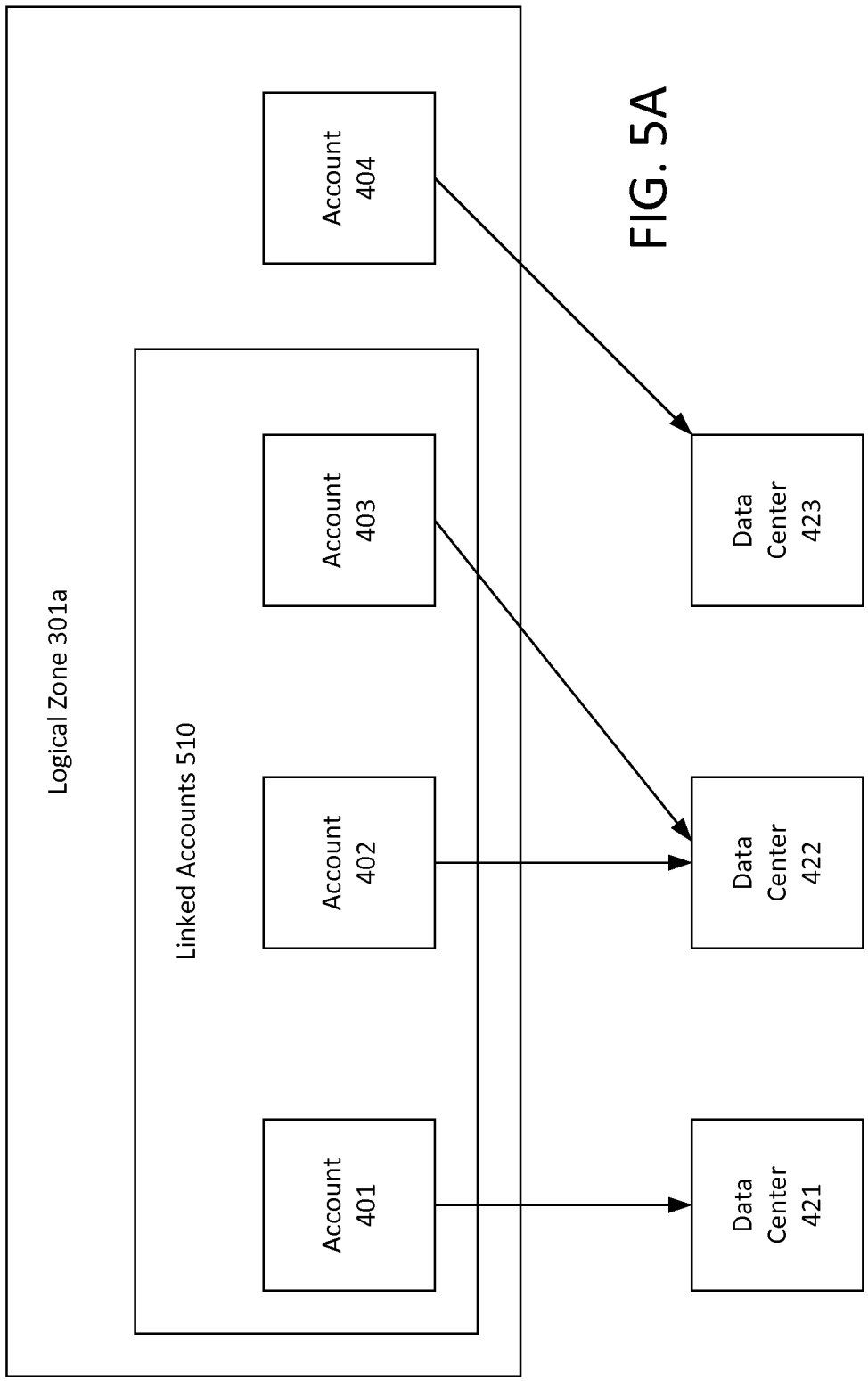

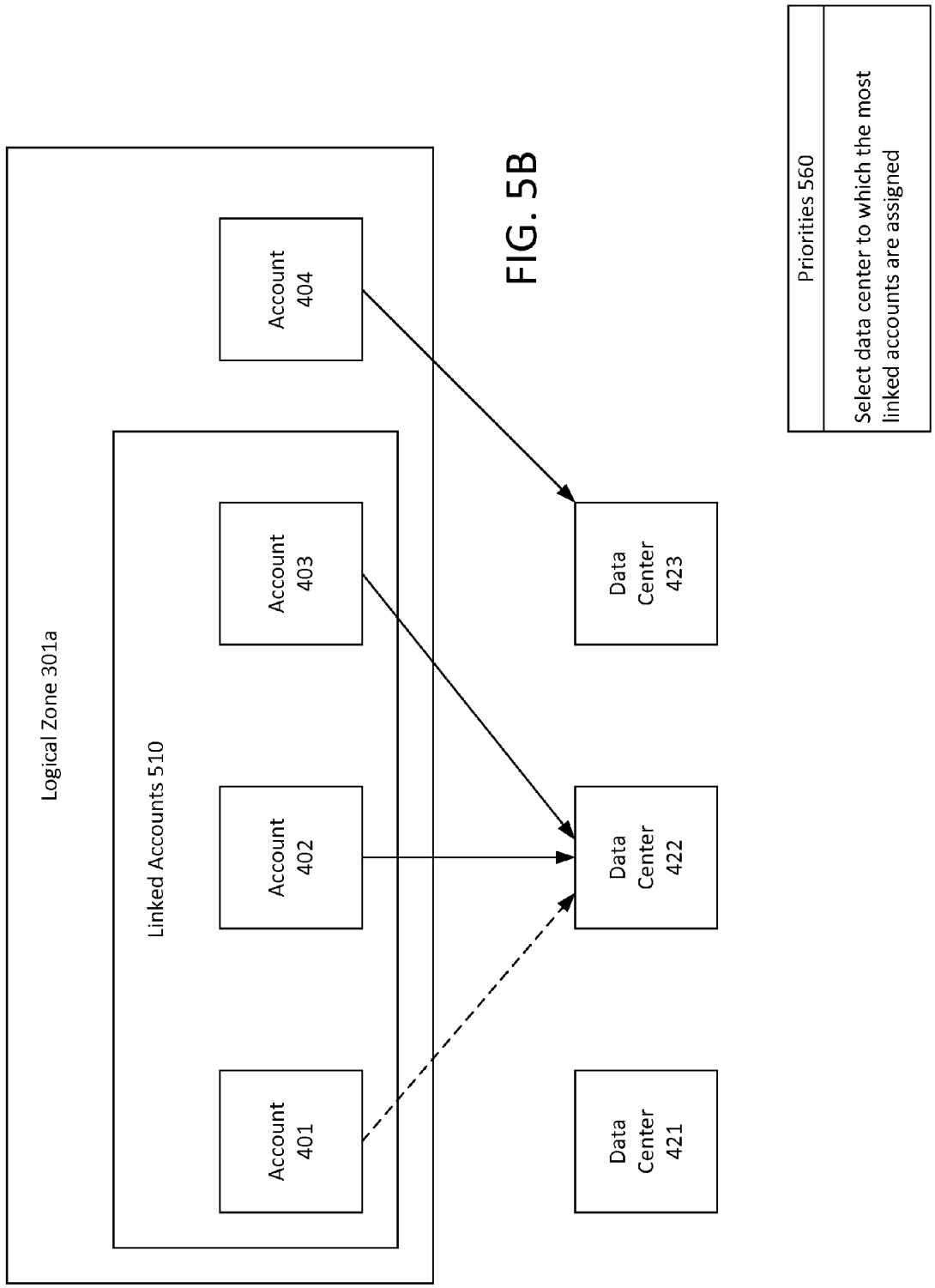

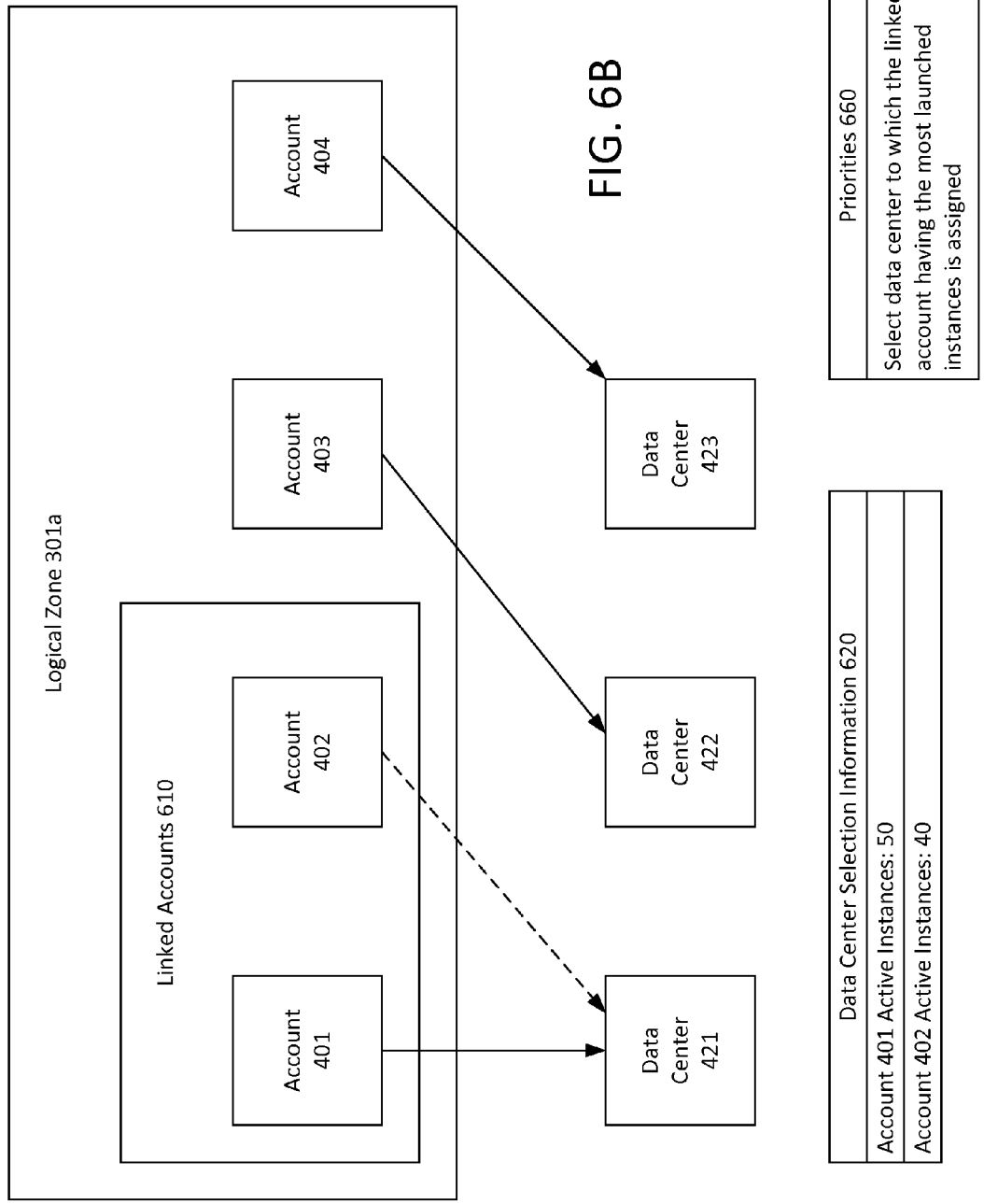

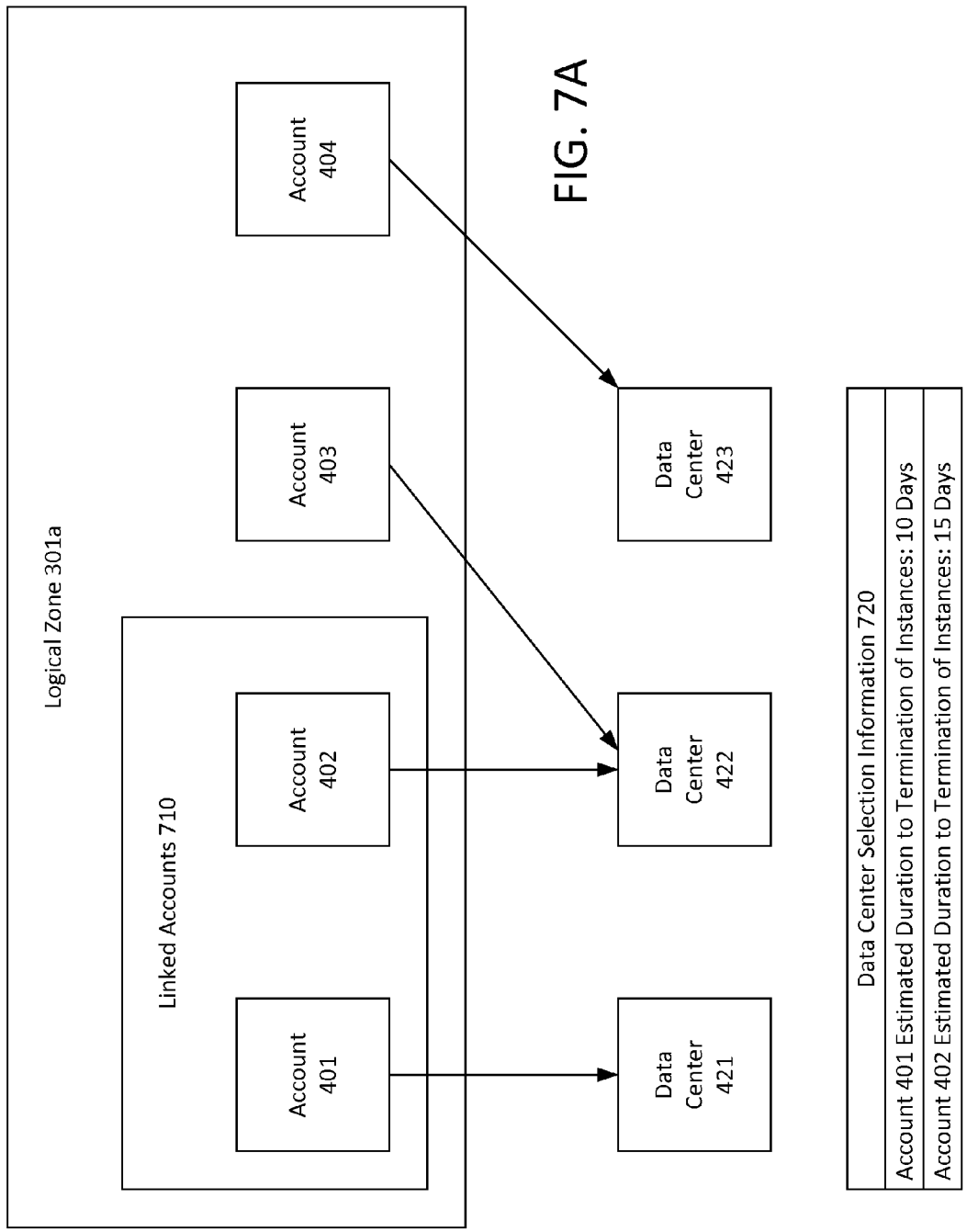

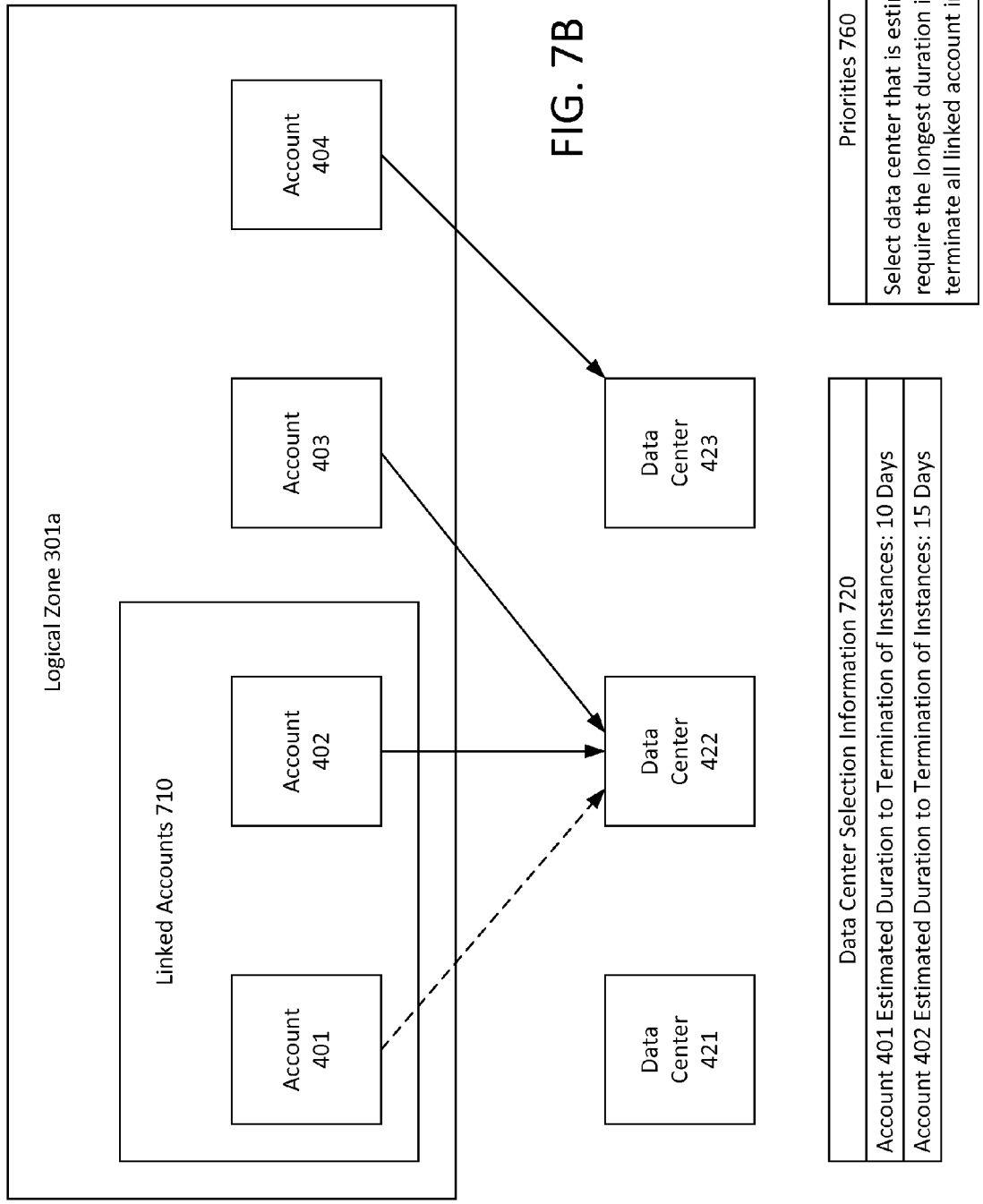

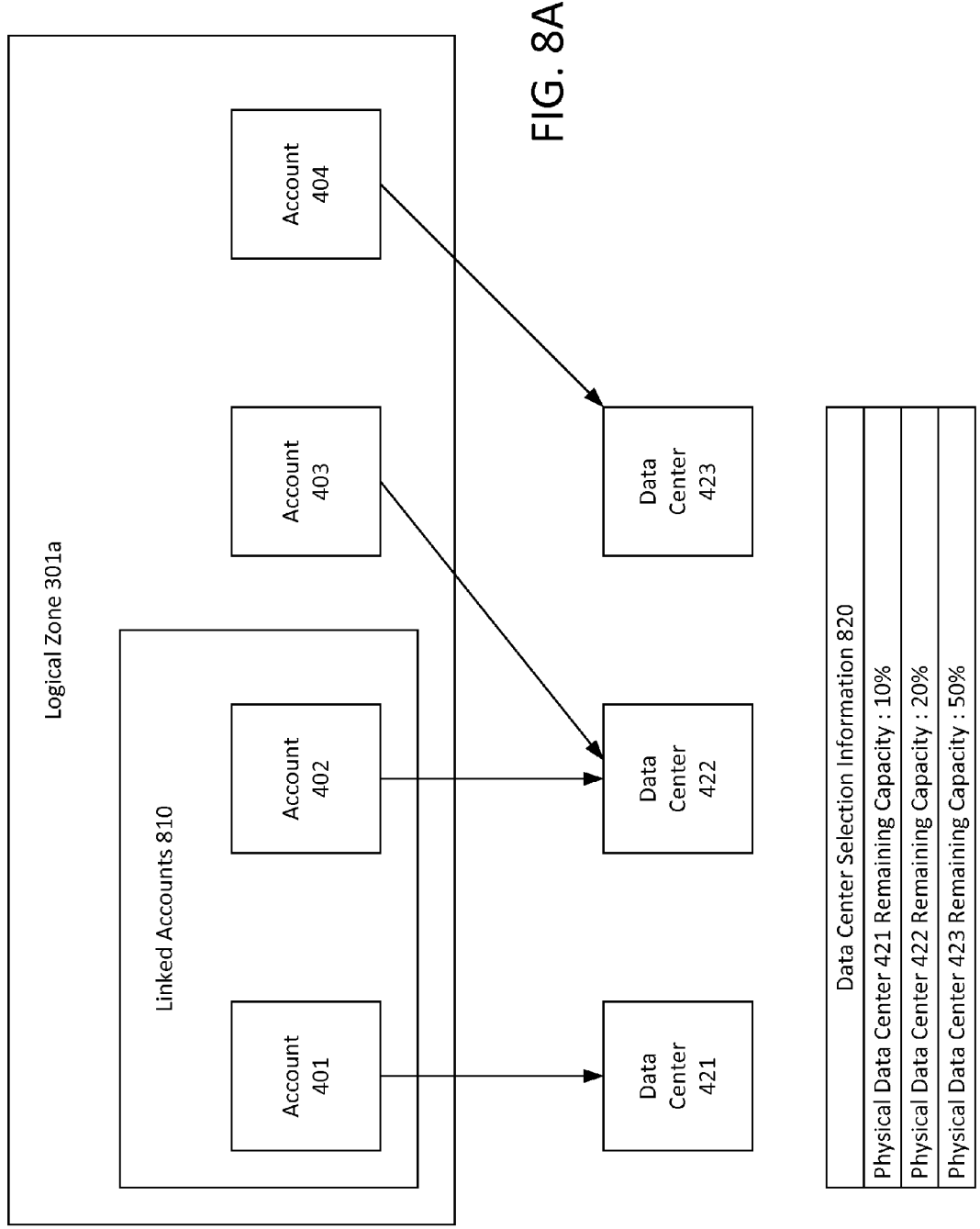

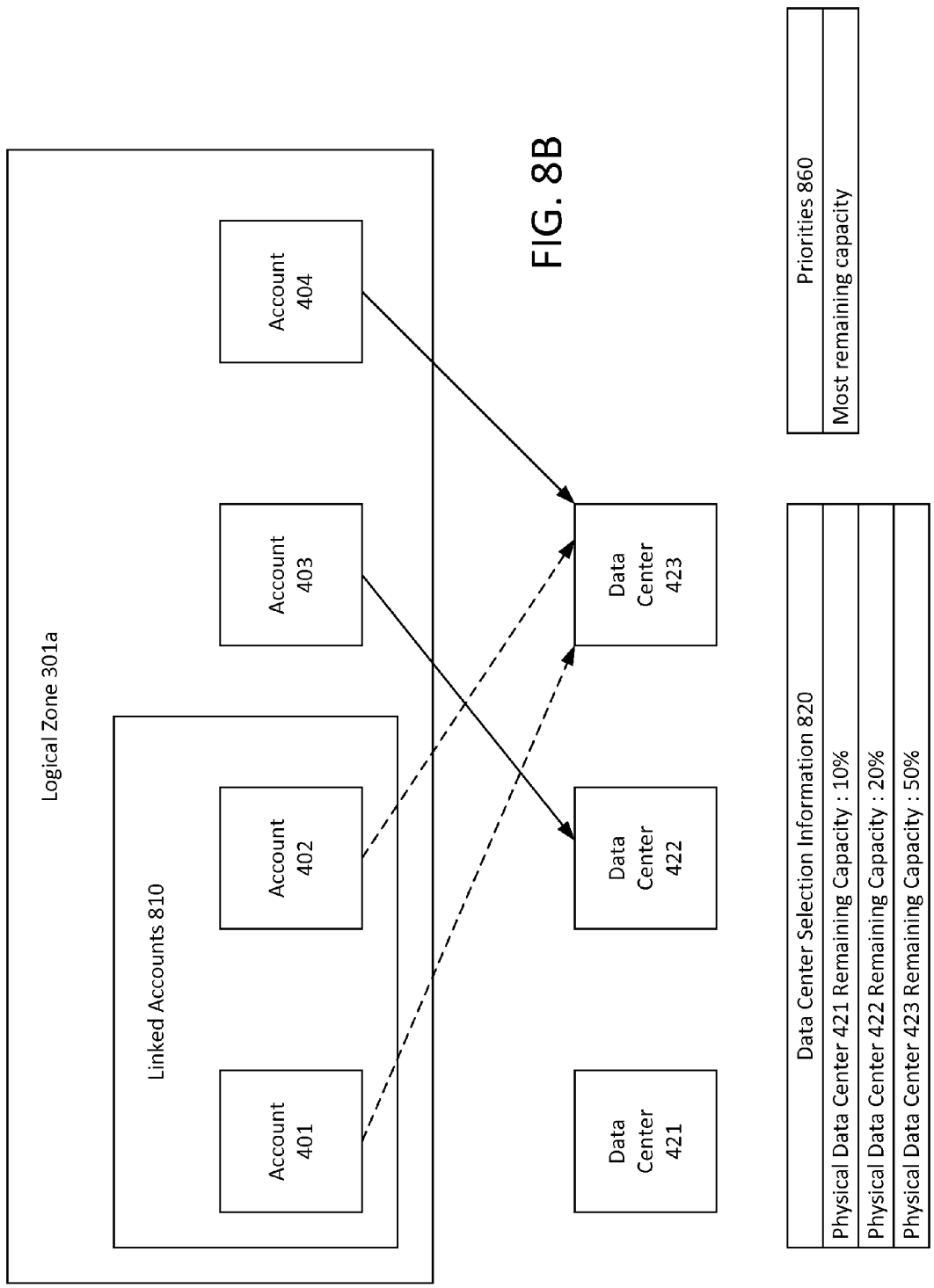

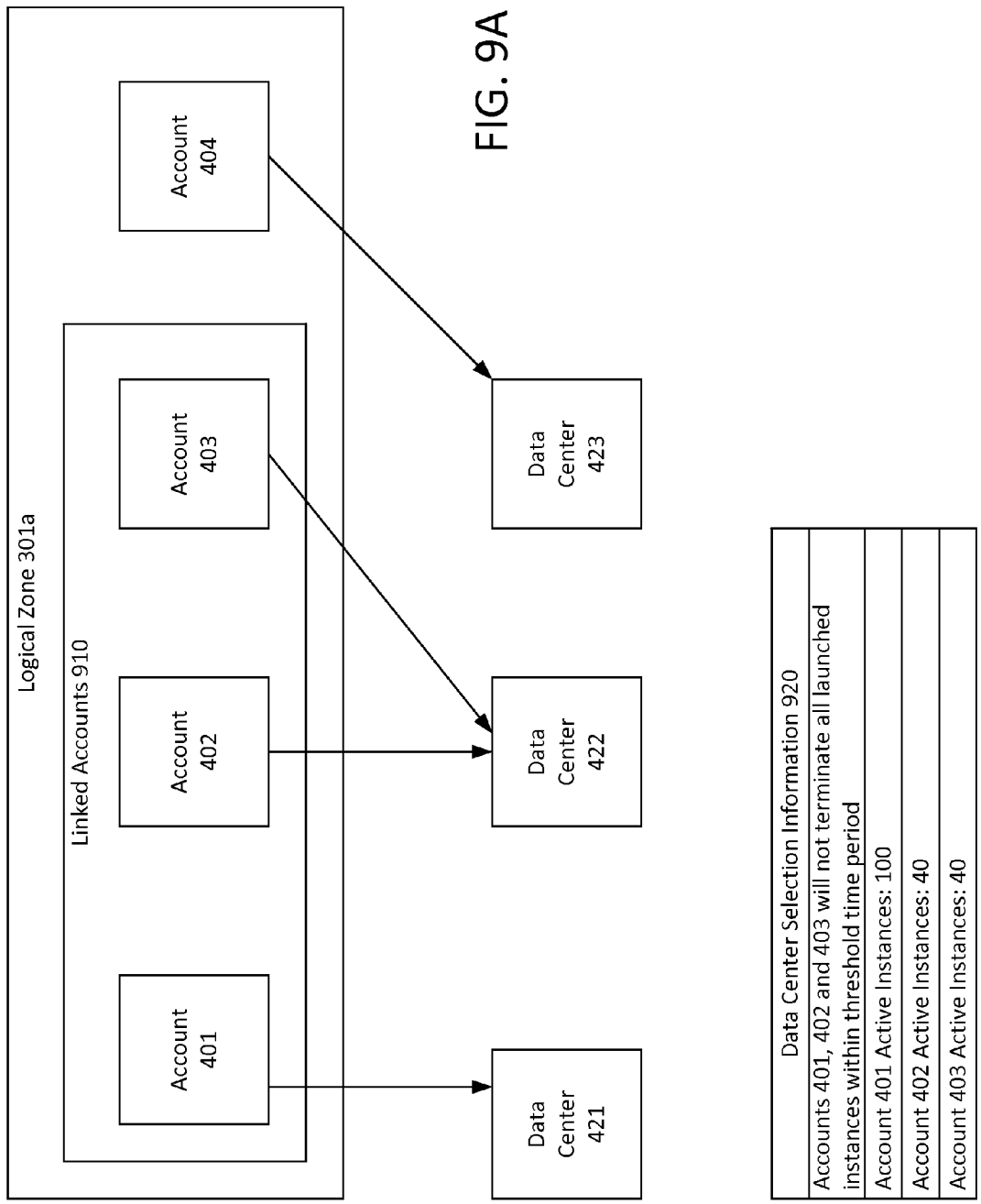

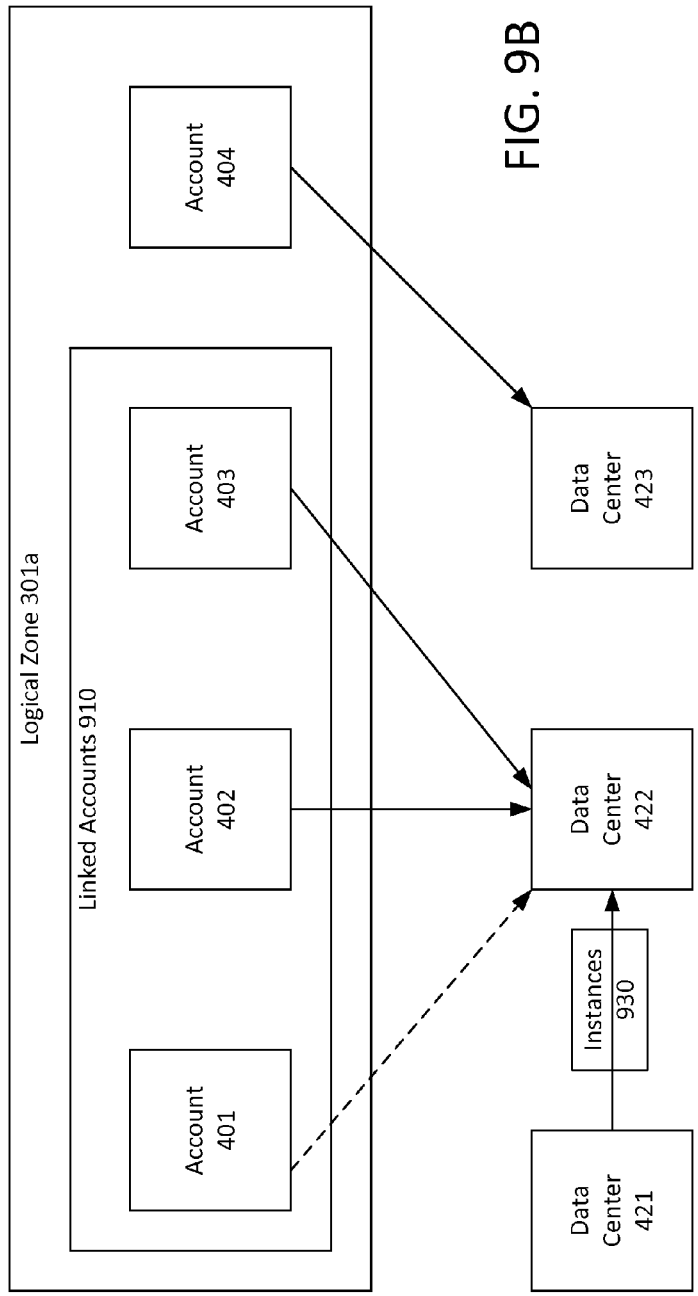

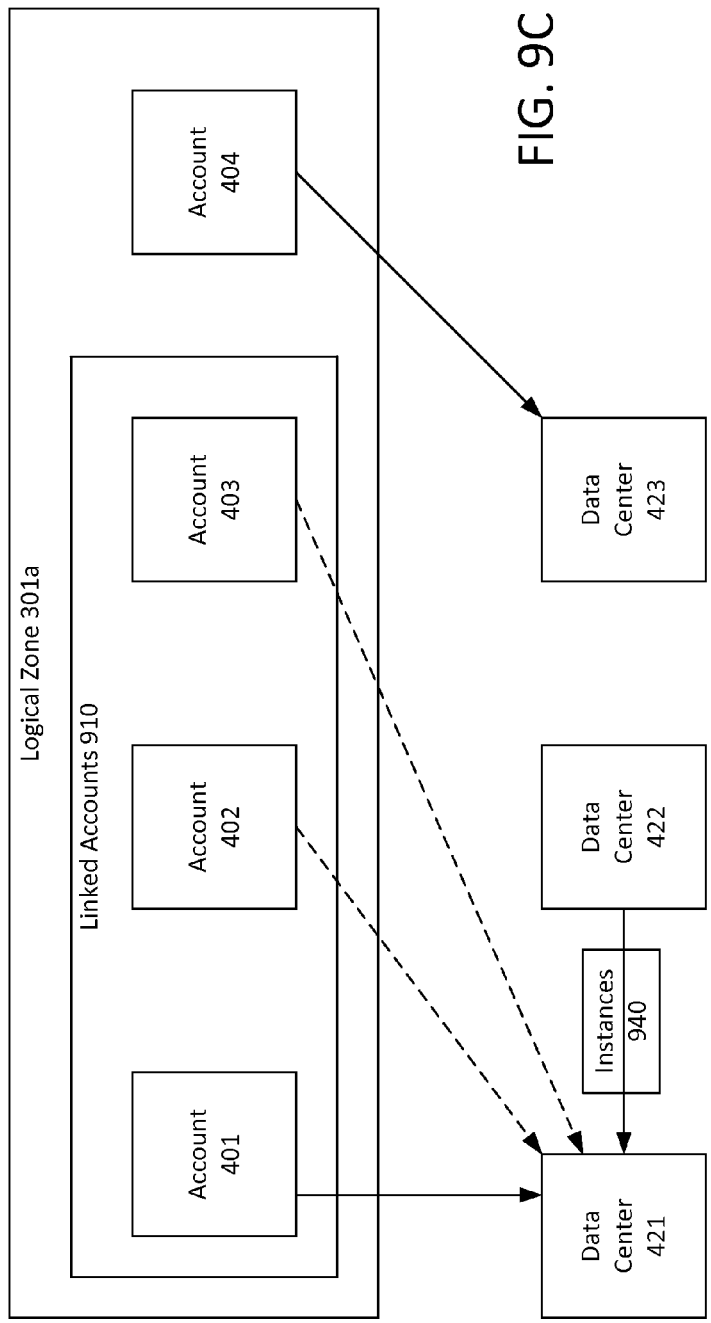

DYNAMIC LOGICAL ZONE ASSIGNMENT

BACKGROUND

There are a number of scenarios in which it may be advantageous to assign a logical computing entity to a particular physical computing entity. One such example scenario may occur when customer accounts purchase computing resources such as virtual machine instances ("instances"). Such instances may be launched within respective data centers, which are collections of physical computing devices. In some cases, an account may launch instances in one or more logical zones, and each such logical zone may be assigned to a corresponding data center such that the account's instances within the logical zone are launched in the corresponding data center. However, the logical to physical assignments may vary between accounts. For example, for Account 1, logical zone 1 may be assigned to data center 1. By contrast, for Account 2, logical zone 1 may be assigned to data center 2. Thus, when Account 1 launches an instance in logical zone 1, the instance will actually be launched in data center 1. By contrast, when Account 2 launches an instance in logical zone 1, the instance will actually be launched in data center 2. Thus, in such scenarios, account owners may be unaware of the exact location and identity of the underlying data center in which their instances are launched.

BRIEF DESCRIPTION OF DRAWINGS

The following detailed description may be better understood when read in conjunction with the appended drawings. For the purposes of illustration, there is shown in the drawings example embodiments of various aspects of the disclosure; however, the invention is not limited to the specific methods and instrumentalities disclosed.

FIGS. 5A-5B are diagrams illustrating a first example data center selection scenario in accordance with the present disclosure.

FIGS. 6A-6B are diagrams illustrating a second example data center selection scenario in accordance with the present disclosure.

FIGS. 7A-7B are diagrams illustrating a third example data center selection scenario in accordance with the present disclosure.

FIGS. 8A-8B are diagrams illustrating a fourth example data center selection scenario in accordance with the present disclosure.

FIGS. 9A-9C are diagrams illustrating example active migration data center selection scenarios in accordance with the present disclosure.

DETAILED DESCRIPTION

Figure 1:
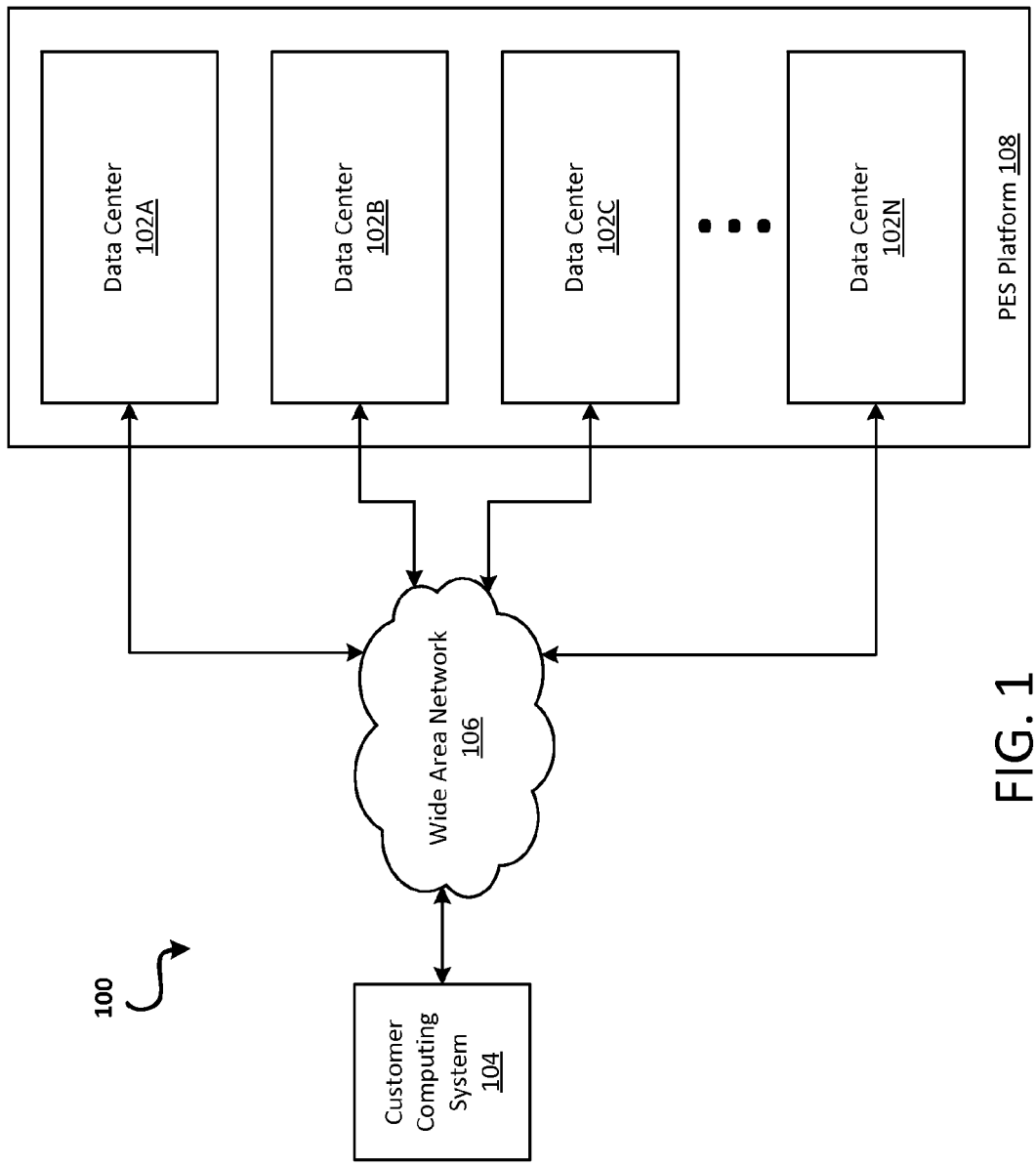
FIG. 1 is a system and network diagram showing aspects of an example operating environment in accordance with the present disclosure.

In general, this disclosure describes techniques for dynamic assignment of a logical zone to a data center. A request may be received to link together a plurality of different accounts. As an example, a customer may issue a request to link together multiple different accounts belonging to the customer. A linkage process may then be initiated for at least one logical zone across the linked accounts. In particular, data center selection information may be obtained including, for example, an identification of the data centers to which each of the linked accounts is currently assigned, linked account usage information and system capacity information. The data center selection information may include any combination of both current and/or historical information. The obtained information may be used to determine a selected data center to which to assign the logical zone across each of the linked accounts. The selected data center may be determined based on one or more selection priorities, which may be set based on input from any combination of a customer, a service provider and/or another party. Any linked accounts not currently assigned to the selected data center may then have instances migrated to the selected data center using, for example, one or more passive and/or active migration techniques. Depending upon factors such as the selected migration techniques and the status of the migrated accounts, migrations may be performed either within immediate time durations or more gradually over time.

One example technique for migrating instances to a selected data center involves the use of a passive migration procedure. As an example, when an account launches a new instance within a logical zone that is not currently assigned to the selected data center, a determination may be made as to whether the account is in an active mapping state. If the account is not in an active mapping state, then the logical zone may be unassigned from its current data center and re-assigned to the selected data center. The new instance may then be launched in the selected data center. An account may be placed in an active mapping state based on one or more mapping events such as, for example, launching an instance in the data center to which it is assigned. An account may be expired from an active mapping state based on one or more unmapping events such as, for example, terminating all instances in the data center to which it is assigned. If an account is not in an active mapping state, then it may be possible to unassign the account from the non-selected data center and re-assign the account to the selected data center with few, if any, negative consequences to the customer. By contrast, if an account is in an active mapping state, then it may be more difficult to unassign the account from the non-selected data center and re-assign the account to the selected data center without negatively impacting the customer experience.

In certain circumstances, an active migration may be preferred over passive migration techniques. For example, in some cases, if it is determined that one or more accounts are unable or unlikely to terminate all instances in a current data center within a threshold time period, then it may be desirable to actively migrate instances for those accounts to a selected data center. Such an active migration may be performed by terminating instances in a non-selected data center and launching corresponding respective instances in the selected data center. An active migration procedure may be performed, for example, in a single stage or in multiple stages with a respective portion of instances migrated in each stage. Additionally, in some cases, new instances may be launched in the selected data center prior to the termination of all instances in the non-selected data center.

FIG. 1 and the following description are intended to provide a brief, general description of a suitable computing environment in which the embodiments described herein may be implemented. In particular, FIG. 1 is a system and network diagram that shows an illustrative operating environment 100 that includes a programmable execution system (PES) platform 108 (which may be referred to as a "PES platform 108") for providing on-demand access to computing resources, such as virtual machine instances. As will be described in greater detail below, the computing resources may be launched or otherwise instantiated based upon an expected cost and value of the computing resources to an operator of the PES platform 108.

The PES platform 108 can provide computing resources for executing applications on a permanent or an as-needed basis. The computing resources provided by the PES platform 108 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources, consisting of many processors, large amounts of memory, and/or large storage capacity, and small resources consisting of fewer processors, smaller amounts of memory and/or smaller storage capacity. Customers may choose to allocate a number of small processing resources as Web servers and/or one large processing resource as a database server, for example.

The computing resources provided by the PES platform 108 are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling and security systems. The data centers 102 might also be located in geographically disparate locations. One illustrative configuration for a data center 102 that implements the concepts and technologies disclosed herein for launching virtual machine instances will be described below with regard to FIG. 2.

The customers and other consumers of the PES platform 108 may access the computing resources provided by the data centers 102 over a wide-area network ("WAN") 106. Although a WAN is illustrated in FIG. 1, it should be appreciated that a local-area network ("LAN"), the Internet or any other networking topology known in the art that connects the data centers 102 to remote customers and other users may be utilized. It should also be appreciated that combinations of such networks might also be utilized.

The customer computing system 104 is a computer utilized by a customer or other consumer of the PES platform 108. For instance, the customer computing system 104 may be a server computer, a desktop or laptop personal computer, a tablet computer, a wireless telephone, a PDA, an e-reader, a game console, a set-top box or any other computing device capable of accessing the PES platform 108.

As will be described in greater detail below, the customer computing system 104 may be utilized to configure aspects of the computing resources provided by the PES platform 108. In this regard, the PES platform 108 might provide a network-based interface through which aspects of its operation may be remotely configured, e.g., through the use of a Web browser application program executing on the customer computing system 104. Alternatively, a stand-alone application program executing on the customer computing system 104 might access an application programming interface ("API") exposed by the PES platform 108 for performing the configuration operations. Other mechanisms for configuring the operation of the PES platform 108, including launching new virtual machine instances on the PES platform 108, might also be utilized.

According to embodiments disclosed herein, the capacity of purchased computing resources provided by the PES platform 108 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of the PES platform 108 can be scaled on-demand.

Auto scaling is one mechanism for scaling computing resources in response to increases or lulls in demand for the resources. Auto scaling allows customers of the PES platform 108 to configure the platform 108 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in the PES platform 108.

The PES platform 108 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared and other types of information. The deployment component utilizes the customer-provided configuration and cache warming logic to launch, configure, and prime new instances of computing resources.

Figure 2:
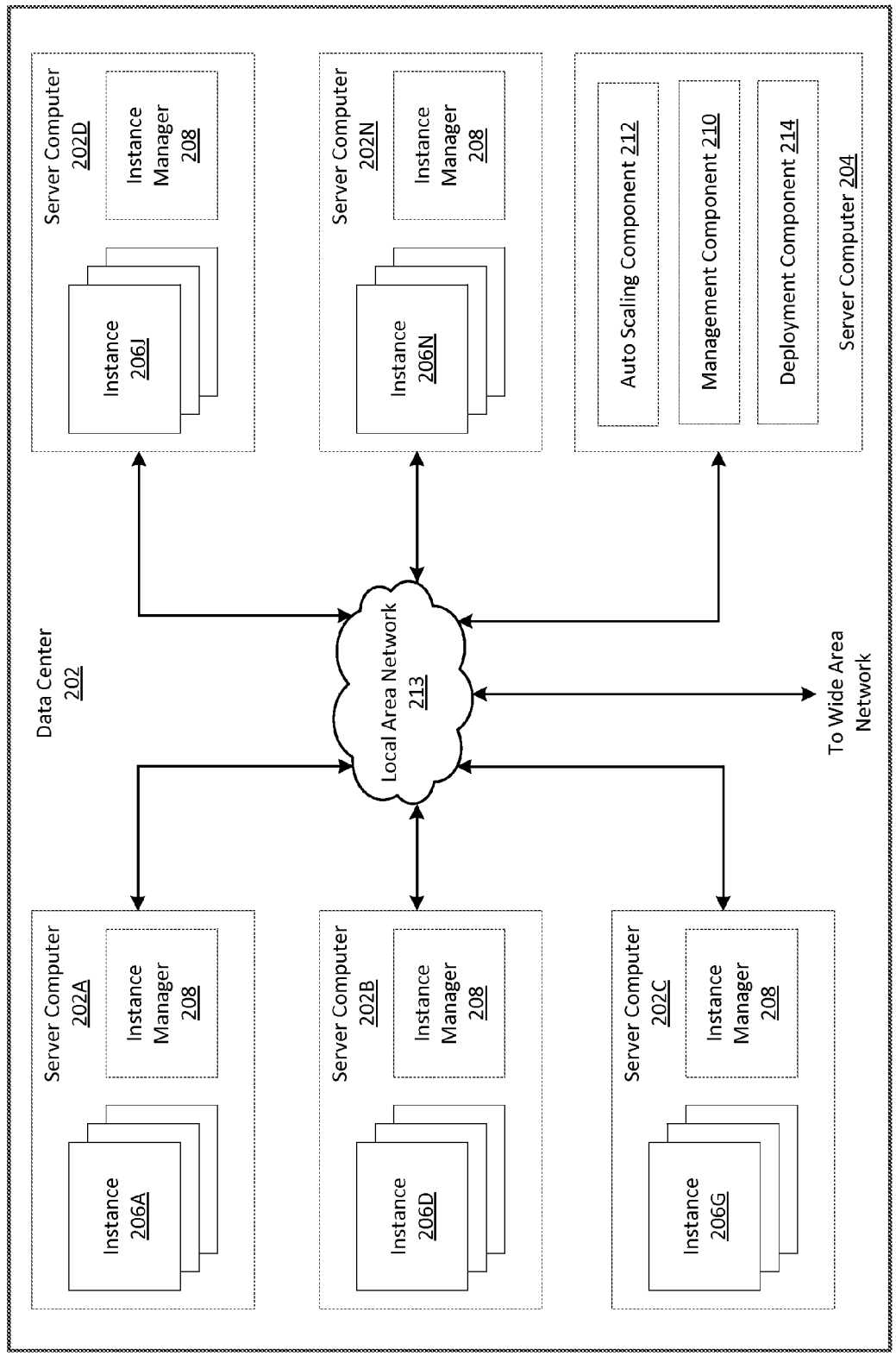
FIG. 2 is a computing system diagram that illustrates an example configuration for a data center in accordance with the present disclosure.

FIG. 2 is a computing system diagram that illustrates one configuration for a data center 102 that implements a PES platform 108, including the concepts and technologies disclosed herein for launching a virtual machine instance. The example data center 102 shown in FIG. 2 includes several server computers 202A-202N (which may be referred herein singularly as "a server computer 202" or in the plural as "the server computers 202") for providing computing resources for executing an application. The server computers 202 may be standard tower or rack-mount server computers configured appropriately for providing the computing resources described above. For instance, in one implementation the server computers 202 are configured to provide instances 206A, 206D, 206G, 206J and 206N of computing resources.

In one embodiment, the instances 206A, 206D, 206G, 206J and 206N (which may be referred herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances 206. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the PES platform 108 might utilize the customer computing system 104 of FIG. 1 to access the management component 210 to configure various aspects of the operation of the PES platform 108 and the instances 206 purchased by the customer. For example, the customer may purchase instances and make changes to the configuration of the instances. The customer might also specify settings regarding how the purchased instances are to be scaled in response to demand. The customer might also provide requests to launch instances to the management component 210.

As also described briefly above, an auto scaling component 212 scales the instances 206 based upon rules defined by a customer of the PES platform 108. In one embodiment, for instance, the auto scaling component 212 allows a customer to specify scale up rules for use in determining when new instances should be instantiated and scale down rules for use in determining when existing instances should be terminated.

The auto scaling component 212 may execute on a single server computer 204 or in parallel across multiple server computers 202 in the PES platform 108. In addition, the auto scaling component 212 may consist of a number of subcomponents executing on different server computers 202 or other computing devices in the PES platform 108. The auto scaling component 212 may be implemented as software, hardware or any combination of the two. The auto scaling component 212 may monitor available computing resources in the PES platform 108 over an internal management network, for example.

As discussed briefly above, the data center 102 may also be configured with a deployment component 214 to assist customers in the deployment of new instances 206 of computing resources. The deployment component 214 may receive a configuration from a customer that includes data describing how new instances 206 should be configured. For example, the configuration might specify one or more applications that should be installed in new instances 206, provide scripts and/or other types of code to be executed for configuring new instances 206, provide cache warming logic specifying how an application cache should be prepared and other types of information.

The deployment component 214 utilizes the customer-provided configuration and cache warming logic to configure, prime, and launch new instances 206. The configuration, cache warming logic, and other information may be specified by a customer using the management component 210 or by providing this information directly to the deployment component 214. Other mechanisms might also be utilized to configure the operation of the deployment component 214.

In the example data center 102 shown in FIG. 2, an appropriate LAN 213 is utilized to interconnect the server computers 202A-202N and the server computer 204. The LAN 213 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. These network topologies and devices should be apparent to those skilled in the art.

It should be appreciated that the data center 102 described in FIG. 2 is merely illustrative and that other implementations might be utilized. In particular, functionality described herein as being performed by the management component 210, the auto scaling component 212, and the deployment component 214 might be performed by one another, might be performed by other components, or might be performed by a combination of these or other components. Additionally, it should be appreciated that this functionality might be implemented in software, hardware, or a combination of software and hardware. Other implementations should be apparent to those skilled in the art.

Figure 3:
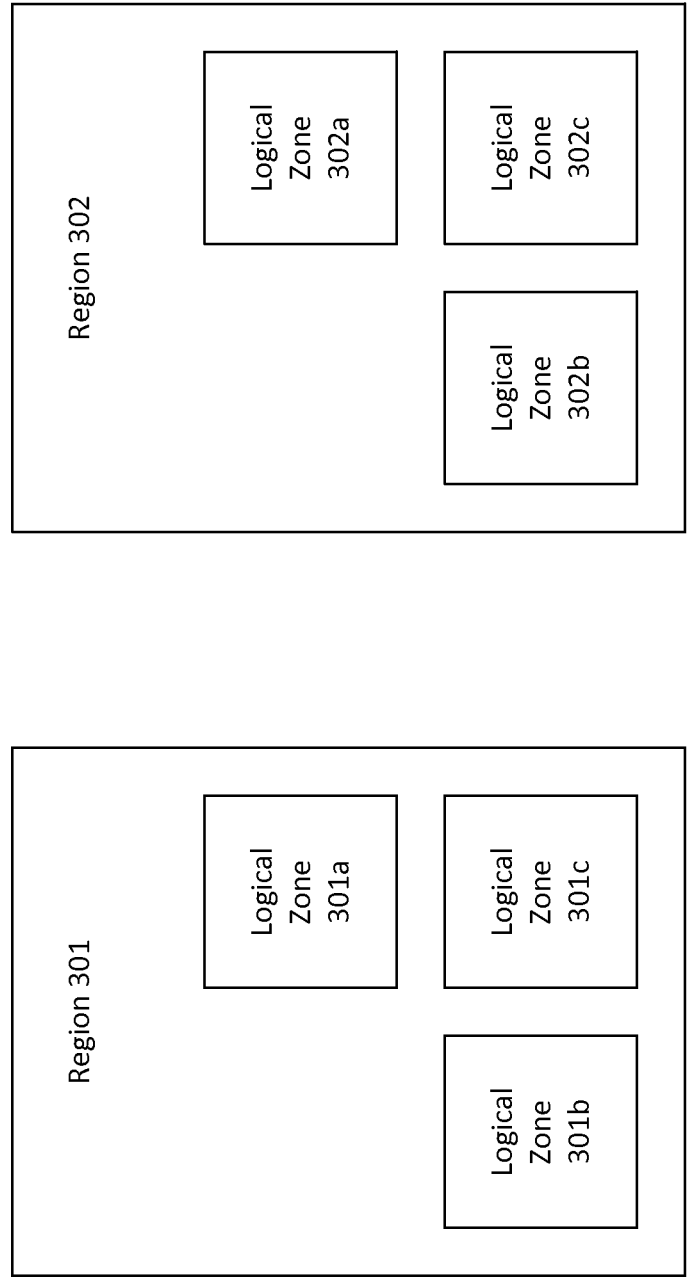
FIG. 3 is a diagram illustrating an example computer resource service provider system in accordance with the present disclosure.

FIG. 3 illustrates an example computer resource service provider system in accordance with the present disclosure. As shown, an example computer resource provider may provide resources such as instances in a number of different regions 301 and 302. Each such region may, for example, correspond to a geographic area such as continent, country or state or area of a country. Each region may include a number of logical zones 301a-c and 302a-c. Each customer or other purchasing entity may have one or more sets of instances, which are referred to herein as "accounts." For each account, each logical zone 301a-c and 302a-c may have an assignment to a corresponding data center such that the account's instances within the logical zone are launched in the corresponding data center. As should be appreciated, each such data center may include any appropriate number of connected computing devices.

Figure 4:
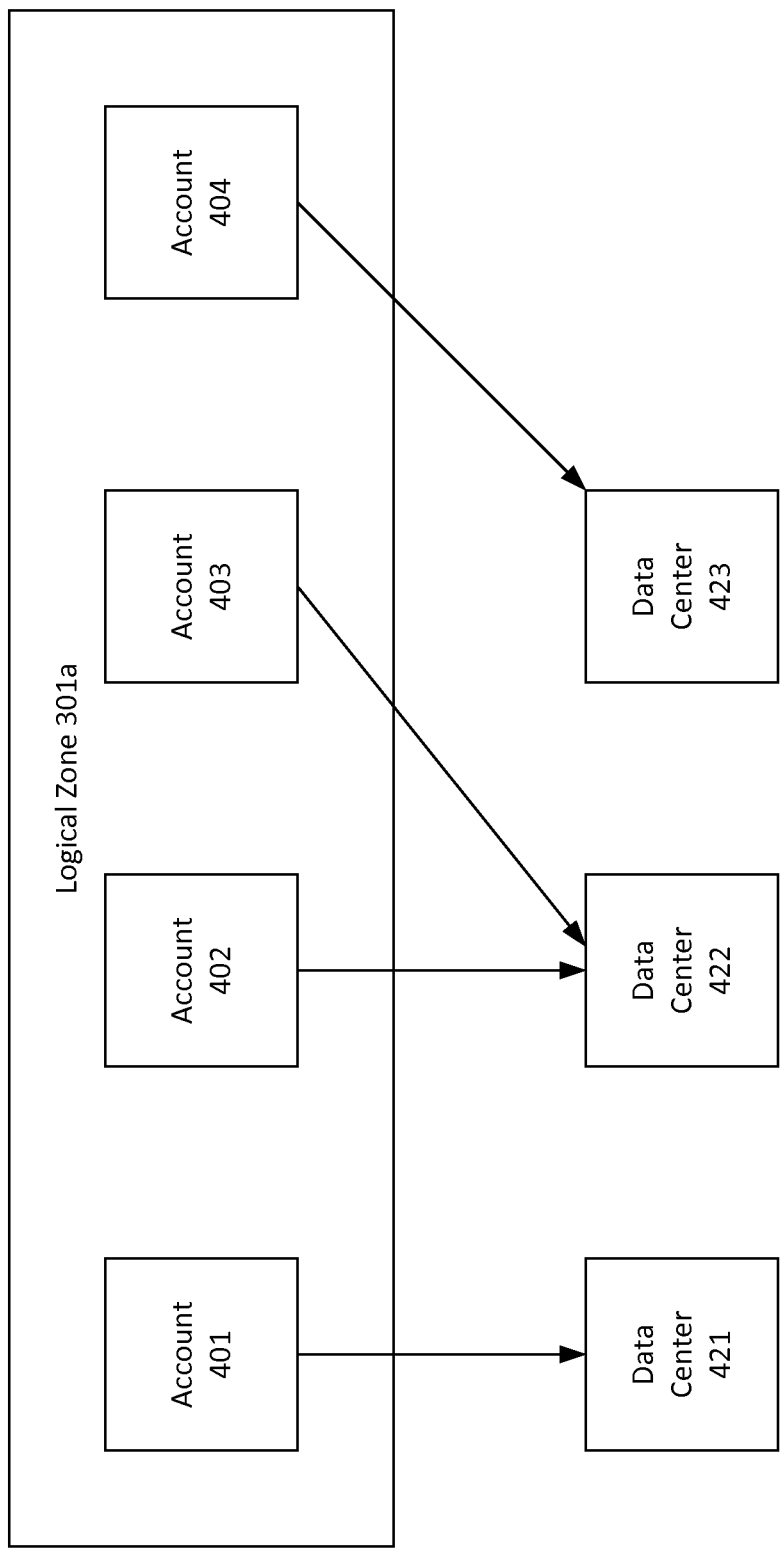
FIG. 4 is a diagram illustrating example logical to physical assignments across a logical zone in accordance with the present disclosure.

As described above, the assignments between logical zones and data centers may vary between accounts. FIG. 4 illustrates example logical to physical assignments across a logical zone in accordance with the present disclosure. As shown, for account 401, logical zone 301a is assigned to data center 421. For accounts 402 and 403, logical zone 301a is assigned to data center 422. For account 404, logical zone 301a is assigned to data center 403. Thus, when account 401 launches an instance in logical zone 301a, the instance will actually be launched in data center 421. When accounts 402 and 403 each launch an instance in logical zone 301a, the respective instance will actually be launched in data center 422. By contrast, when account 404 launches an instance in logical zone 301a, the instance will actually be launched in data center 423.

While some customers may have limited information regarding underlying data centers, there are a number of scenarios in which logical to physical assignments may be of increased importance. As an example, it may be common for some customers to open and hold multiple different accounts with a particular service provider. There may be a number of benefits for a particular customer to have its associated accounts operating instances for the same logical zone in the same underlying data center. For example, having its instances operating in the same data center may make it easier for a particular customer to transfer data between different accounts, reduce latency, minimize bandwidth costs and increase redundancy. For these and other reasons, it may be advantageous for a particular customer's accounts to each have the same logical zone assigned to the same data center.

In accordance with an aspect of the present disclosure, certain accounts may be linked together with one another such that the logical to physical assignments are correlated across the linked accounts. For example, as described above, a customer can request a linking of each of the customer's accounts. When a link of accounts is requested, data center selection information may be obtained for use in selecting a particular data center for the linked accounts. The data center selection information may include, for example, an identification of the data centers to which each of the linked accounts is currently assigned, linked account usage information, system capacity information and any other information that would be useful in determining a selected data center for the linked accounts. The data center selection information may include any combination of both current and/or historical information.

As mentioned above, the data center selection information may include linked account usage information. The linked account usage information may include, for example, a number of currently launched instances within the logical zone for each of the linked accounts. The linked account usage information may also include other information, such as information that would assist with estimating a duration until each linked account will terminate all instances within the logical zone. For example, information regarding an average historical operating duration (e.g., from launch to termination) of an account's instances may assist in estimating how long it will take the account to terminate its instances. Other relevant information may include, for example, an average duration since launch for each of the currently launched instances, an average historical number of launched instances at any given time period, an average frequency of launching new instances and a measure of data dependency. Such relevant information may be calculated over any desired time period and across any desired domain including, for example, a particular logical zone, a particular region or across the entire account.

The data center selection information may also include system capacity information for one or more data centers. The capacity information may be limited to only those data centers to which the linked accounts are currently assigned or may include information for all data centers available to the logical zone. The capacity information may include a current operating capacity and may also include any information that would assist with estimating a future operating capacity. Such information may include, for example, an average historical operating duration (e.g., from launch to termination) of instances within the data center, an average duration since launch for each of the currently launched instances, an average historical number of launched instances at any given time period and an average frequency of launching new instances. Such relevant information may be calculated over any desired time period.

Additionally, in some cases, some data centers may be placed into certain designated states in order to indicate their available capacity. As an example, a data center may be placed in a state to indicate that no new accounts should be assigned to that data center referred to herein as a "not mappable" state. Thus, only those existing accounts that are assigned to the data center at the initiation of the not mappable state may continue to operate instances within that data center. Additionally, once an existing account has terminated all instances within the data center, the not mappable state may also prevent those accounts from launching any further instances within that data center.

In addition to the examples set forth above, the data center selection information may include any number of other types of alternative or additional information. For example, information about the linked accounts' usage in one logical zone may also be compared with usage in other logical zones in order to, for example, select a data center with appropriate capacity for the relative usage of the particular logical zone. Also, information may be obtained regarding whether any block storage volumes have been created for an account within a logical zone. Other information such as requests to describe a spot price history may also be considered. Additionally, for example, if a particular data center is experiencing problems or needs to be shut down for maintenance in the near future, then this information may also be used to select a data center. Furthermore, if any new data centers are being added or expanded, then this information may also be considered.

Once data center selection information has been obtained, the obtained information may be used to determine a selected data center to which to assign the logical zone across each of the linked accounts. The selected data center may be determined based upon one or more selection priorities, which may be set based on input from any combination of a customer, a service provider and/or another party. Such priorities may include, for example, a data center to which the most linked accounts are assigned, a data center to which a linked account with the most launched instances is assigned, a data center that is estimated to require the longest duration in order to terminate all linked account instances, a data center that has the most remaining available capacity and any other appropriate priority. The selection priorities such as those listed above may be employed in any appropriate combinations and may each be assigned any appropriate respective weights.

In addition to the priorities set forth above, there are a number of other preventative factors that may weigh against or even eliminate a data center from consideration to be a selected data center. Some example preventative factors may include placement of a data center into the not mappable state and a determination that a data center is already assigned to other logical zones for one or more linked accounts.

Some example data center selection scenarios will be described below with references to FIGS. 5A-B, 6A-B, 7A-B and 8A-B. As should be appreciated, the scenarios depicted in these figures are intended to provide an understanding of some examples of the disclosed techniques and are non-limiting. Additionally, any combination of the logic depicted in these figures and any alternative or additional logic may also be employed.

A first example data center selection scenario is shown in FIGS. 5A and 5B. As shown in FIG. 5A, a request is received to link accounts 401, 402 and 403, as indicated by linked accounts box 510 surrounding those accounts. Two linked accounts (accounts 402 and 403) are assigned to data center 422, while only a single linked account (account 401) is assigned to data center 421. Referring now to FIG. 5B, priorities box 560 indicates that a priority is set for selecting the data center to which the most linked accounts are assigned. Accordingly, as shown in FIG. 5B, data 422 is chosen as the selected data center as indicated by the arrows extending from each of the linked accounts 401, 402 and 403 to data center 422. In order to achieve this result, as indicated by the dashed line in FIG. 5B, account 401 may be un-assigned from data center 421 and re-assigned to data center 422. This re-assignment may be performed using any of the example re-assignment techniques that will be discussed in detail below.

Figure 6A:
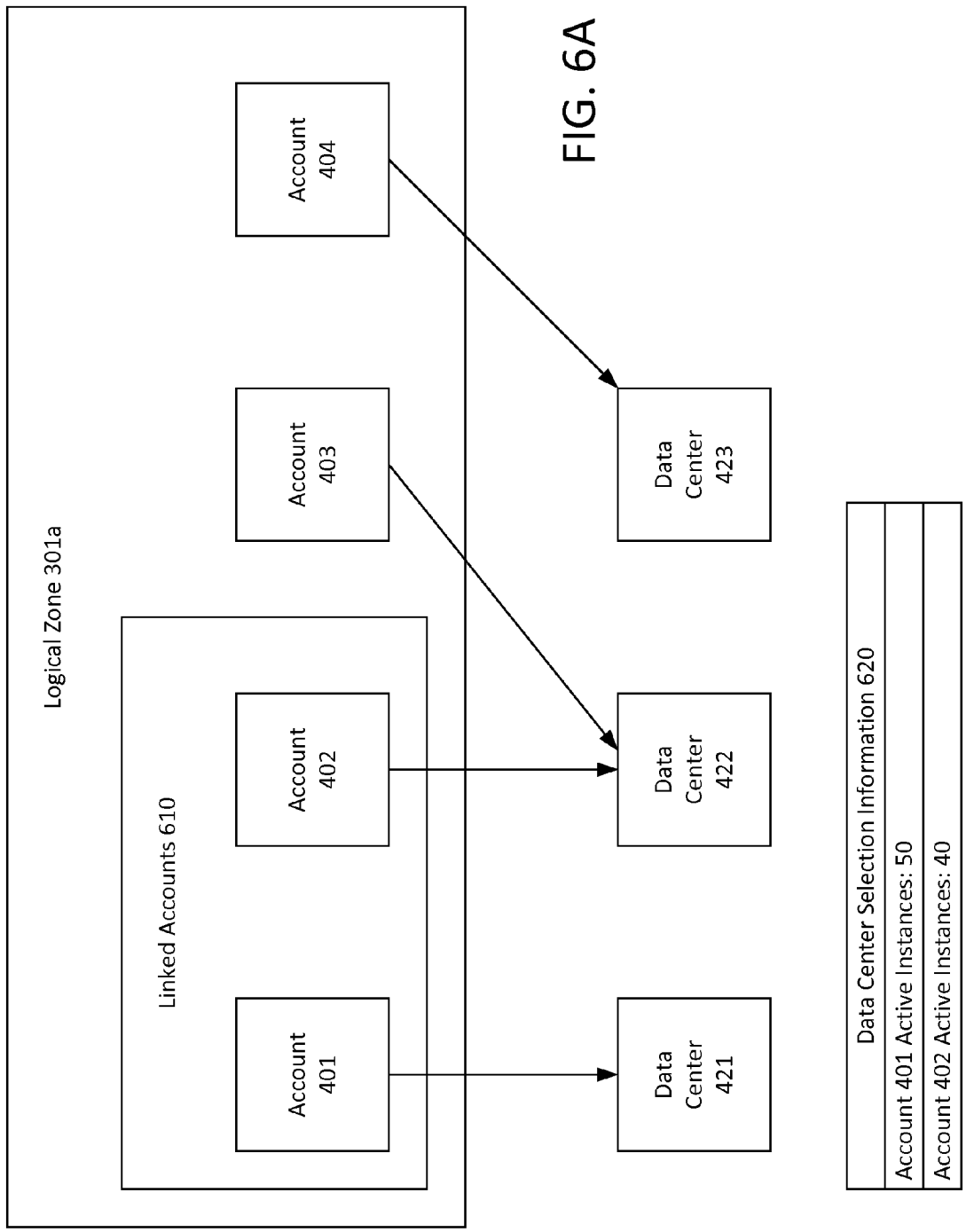

A second example data center selection scenario is shown in FIGS. 6A and 6B. As shown in FIG. 6A, a request is received to link accounts 401 and 402, as indicated by linked accounts box 610 surrounding those accounts. Additionally, data center selection information 620 indicates that account 401 has 50 active instances, and account 402 has 40 active instances. Thus, based on information 620, account 401 currently has more active instances than linked account 402. Referring now to FIG. 6B, priorities box 660 indicates that a priority is set for selecting the data center to which the linked account having the most launched instances is assigned. Accordingly, as shown in FIG. 6B, data center 421 is chosen as the selected data center as indicated by the arrows extending from each of the linked accounts 401 and 402 to data center 421. In order to achieve this result, as indicated by the dashed line in FIG. 6B, account 402 may be un-assigned from data center 422 and re-assigned to data center 421.

A third example data center selection scenario is shown in FIGS. 7A and 7B. As shown in FIG. 7A, a request is received to link accounts 401 and 402, as indicated by linked accounts box 710 surrounding those accounts. Additionally, data center selection information 720 indicates that account 401 is estimated to terminate all its instances in data center 421 in 10 days, and account 402 is estimated to terminate all its instances in data center 422 in 15 days. Thus, based on information 720, account 402 is estimated to require a longer duration to terminate its instances than linked account 401. Referring now to FIG. 7B, priorities box 760 indicates that a priority is set for selecting the data center that is estimated to require the longest duration in order to terminate all linked account instances. Accordingly, as shown in FIG. 7B, data center 422 is chosen as the selected data center as indicated by the arrows extending from each of the linked accounts 401 and 402 to data center 422. In order to achieve this result, as indicated by the dashed line in FIG. 7B, account 401 may be un-assigned from data center 421 and re-assigned to data center 422.

As should be appreciated, any combination of the example usage information factors set forth above and/or other information may be employed in order to provide the duration estimations included in data center selection information 720. Additionally, in some cases, the estimated duration for termination of instances may not be proportional to the current number of active instances and may result in a different data center selection than a selection based on the current number of active instances. For example, an account may have a small number of active instances but may also have associated historical data indicating that its instances remain active for very long durations. In this scenario, that account, based on its historical data, may have a longer estimated termination duration despite the fact that it has few active instances.

A fourth example data center selection scenario is shown in FIGS. 8A and 8B. As shown in FIG. 8A, a request is received to link accounts 401 and 402, as indicated by linked accounts box 810 surrounding those accounts. Additionally, data center selection information 820 indicates that data center 421 has 10% remaining available capacity, data center 422 has 20% remaining capacity and data center 423 has 50% remaining available capacity. It is assumed for this example that each data center offers identical total capacity. Thus, based on information 820, data center 423 has the most remaining available capacity. Referring now to FIG. 8B, priorities box 860 indicates that a priority is set for selecting the data center with most remaining available capacity. Accordingly, as shown in FIG. 8B, data center 423 is chosen as the selected data center as indicated by the arrows extending from each of the linked accounts 401 and 402 to data center 423. In order to achieve this result, as indicated by the dashed lines in FIG. 8B, both accounts 401 and 402 may be un-assigned from their current data centers and re-assigned to data center 423.

As set forth above, once a selected data center is determined, any linked accounts not currently assigned to the selected data center may then be dynamically re-assigned to the selected data center. As will be described in further detail below, depending upon various factors, the necessary re-assignments may occur either more immediately or more gradually over time. In particular, a number of passive and active techniques are disclosed herein for migrating instances from a non-selected data center to the selected data center. Some example passive migration techniques will now be described below, and some active migration techniques are described subsequently in this disclosure.

One example passive migration technique involves a determination of whether an account is currently in an active mapping state. More specifically, if an account is not in an active mapping state, then it may be possible to unassign the account from the non-selected data center and re-assign the account to the selected data center with few, if any, negative consequences to the customer. By contrast, if an account is in an active mapping state, then it may be more difficult to unassign the account from the non-selected data center and re-assign the account to the selected data center without negatively impacting the customer experience. Thus, when a linked account launches a new instance within a logical zone that is not currently assigned to the selected data center, a determination may be made as to whether the account is in an active mapping state. If the account is not in an active mapping state, then the logical zone may be unassigned from its current data center and re-assigned to the selected data center. The new instance may then be launched in the selected data center. By contrast, if the account is in an active mapping state, then the re-assignment of the account may be deferred to a later time.

An account may be placed in an active mapping state based upon the occurrence of one or more mapping events. Additionally, an account may be expired from an active mapping state based upon the occurrence of one or more unmapping events. Mapping events may include, for example, launching of an instance within the logical zone. Other mapping events may include, for example, creation of a block storage volume for an account within a logical zone or a request by an account to describe a spot price history. By contrast, unmapping events may include, for example, termination of all instances within the logical zone. Other unmapping events may include, for example, removal of a block storage volume for an account within a logical zone or a determination that the account has not issued a request to describe a spot price history within a specified time period. Any number of appropriate alternative or additional mapping and unmapping events may also be employed In an embodiment, some mapping events may trigger an active mapping state for only a particular logical zone, while other mapping events may trigger an active mapping state across multiple or all logical zones. One example technique for implementing this embodiment may be to construct rules such that a mapping event triggers an active mapping state only in the minimum number of logical zones implicated by the event. For example, in some cases, launching an instance may trigger an active mapping state only for the logical zone in which the instance is launched. As another example, in some cases, a request by an account to describe a spot price history may trigger an active mapping state across all logical zones. Similarly, some unmapping events may remove an active mapping state for only a particular logical zone, while other unmapping events may remove an active mapping state across multiple or all logical zones. For example, in some cases, termination of all instances in a logical zone may remove an active mapping state only for the logical zone in which the instances are terminated. As another example, in some cases, a determination that the account has not issued a request to describe a spot price history within a specified time period may remove an active mapping state across all logical zones.

In certain circumstances, an active migration may be preferred over passive migration techniques such as those set forth above. For example, in some cases, if it is determined that one or more accounts are unable or unlikely to terminate all instances in a data center within a threshold time period, then it may be desirable to actively migrate instances for one or more those accounts to a selected data center. Such a threshold time period may be determined based on input provided by any combination of a customer, a service provider and/or another party. There may also be any number of additional or alternative reasons for performing an active migration such as, for example, if one or more data centers need to acquire additional capacity within a short time period or any other appropriate reasons.

Similar to passive migrations, the selected data center for an active migration may be determined based upon one or more selection priorities. However, the selection logic for an active migration may, in some cases, be different than the selection logic for a passive migration. The selection priorities for an active migration may include, for example, migrating instances for the fewest necessary linked accounts, migrating the fewest instances across all linked accounts, migrating the least total amount of data across all linked accounts, a data center that has the most remaining available capacity and any other appropriate priority. The selection priorities such as those listed above may be employed in any appropriate combinations and may each be assigned any appropriate respective weights. Any number of additional or alternative priorities may also be employed. For example, in some cases, a customer may prioritize certain accounts for which the customer is less willing to incur service interruptions. The data center may then be selected such that active migration of these prioritized accounts is minimized Other factors such as, for example, data dependencies in certain accounts may also be taken into consideration.

In addition to the priorities set forth above, there are a number of other preventative factors that may weigh against or even eliminate a data center from consideration to be a selected data center. Some example preventative factors may include placement of a data center into the not mappable state and a determination that a data center is already assigned to other logical zones for one or more linked accounts.

Some example data center selection scenarios for an active migration will be described below with references to FIGS. 9A-C. As should be appreciated, the scenarios depicted in these figures are intended to provide an understanding of some examples of the disclosed techniques and are non-limiting. Additionally, any combination of the logic depicted in these figures and any alternative or additional logic may also be employed.

As shown in FIG. 9A, a request is received to link accounts 401, 402 and 403, as indicated by linked accounts box 910 surrounding those accounts. Data center selection information 920 indicates that accounts 401, 402 and 403 are all estimated to require more than the threshold duration in order to terminate all instances within the logical zone 301a. Thus, based on the estimated threshold duration determinations in data center selection information 920, it may be determined that an active migration technique is desired. Any combination of the example usage information factors set forth above and/or other information may be employed in order to make the estimated threshold duration determinations included in data center selection information 920.

As should be appreciated, an active migration to data center 421 would require a migration of instances for two accounts (accounts 403 and 403). By contrast, an active migration to data center 422 would require a migration of instances for only a single account (account 401). Referring now to FIG. 9B, priorities box 960 indicates that a priority is set for migrating instances for the fewest necessary linked accounts. Accordingly, as shown in FIG. 9B, data center 422 is chosen as the selected data center as indicated by the arrows extending from each of the linked accounts 401, 402 and 403 to data center 422. In order to achieve this result, as indicated by the dashed line in FIG. 9B, instances for account 401 are migrated from data center 421 to data center 422. Additionally, the transition of instances between data centers is indicated in FIG. 9B by the arrow pointing from data center 421 to data center 422 through instances box 930.

In addition to the estimated threshold duration determinations, data center selection information 920 also indicates that account 401 has 100 active instances, and accounts 402 and 403 each have 40 active instances. Thus, based on information 920, account 401 currently has more active instances (100 instances) than the combination of accounts 402 and 403 (80 instances). Thus, although accounts 402 and 403 are two separate accounts, the combined migration of instances for accounts 402 and 403 would actually result in a migration of 20 fewer instances than if only instances for account 401 were migrated. Referring now to FIG. 9C, priorities box 970 indicates that a priority is set for migrating the fewest number of instances. Accordingly, as shown in FIG. 9C, data center 421 is chosen as the selected data center as indicated by the arrows extending from each of the linked accounts 401, 402 and 403 to data center 421. In order to achieve this result, as indicated by the dashed lines in FIG. 9C, instances for accounts 402 and 403 are migrated from data center 421 to data center 422. Additionally, the transition of instances between data centers is indicated in FIG. 9C by the arrow pointing from data center 422 to data center 421 through instances box 940.

In some cases, customers may prefer the selection logic depicted in FIG. 9B over the selection logic depicted in FIG. 9C because they may prefer to have more of their accounts continue to operate in the same data center to which they currently assigned. In other cases, customers may prefer the selection logic depicted in FIG. 9C over the selection logic depicted in FIG. 9B because it may result in fewer of their instances being migrated and may also in some cases require less total time to perform the migration process. As should be appreciated, any number of additional or alternative types of selection priorities or other logic may be included in the data center selection process for an active migration. For example, in some cases, a selected data center for an active migration may be determined based on a selection priority to migrate the least total amount of data across each of the linked accounts.

The active migration techniques described herein may be performed by terminating instances in a non-selected data center (i.e., the data center from which the account instances are being migrated) and launching respective instances in a selected data center (i.e., the data center to which the account instances are being migrated). In some cases, an active migration may involve a migration of not only instances but also additional data such as, for example, block storage volume data. Additionally, in some cases, the active migration process may require certain outage periods during which all or some of the migrated instances and/or data are unavailable. Furthermore, in some cases, accounts may simultaneously operate instances in both the selected and the non-selected data center during at least some portion of the active migration process.

The active migration techniques disclosed herein may be performed in any appropriate order and time period. For example, in some cases, instances and/or data may be migrated gradually in multiple stages from one data center to another. In other cases, instances and/or data may be migrated in only a single stage. In some cases, fewer stages may be preferred because they may require fewer outage periods, while, in other cases, more stages may be preferred because they may require a shorter average duration of outage periods. In some cases, to minimize or eliminate any outage periods, instances in the non-selected physical data center may continue to execute while respective new instances are launched in the selected physical data center. The instances in the non-selected physical data center may continue to operate until all or almost all respective instances in the selected data center are operational.

In certain scenarios, a default may be set such that an account for which instances are being actively migrated will launch all new instances in the selected data center to which the instances are being actively migrated. Additionally, in certain scenarios, an account owner may be informed or may otherwise become aware that an account is having its instances migrated from a non-selected to a selected data center. The account owner may then voluntarily choose to launch some or all new instances in the selected data center. In some cases, the account owner may even voluntarily choose to terminate some existing instances in the non-selected data center and to open new respective instances in the selected data center.

Thus, a number of example passive and active migration techniques such as those set forth above may be employed to migrate an account from a non-selected data center to a selected data center. As also set forth above, such passive and/or active migration techniques may be employed as part of an overall process of linking multiple accounts across a particular logical zone. It is noted, however, that the passive and active migration techniques disclosed herein need not necessarily be performed in connection with an account linking operation. In some cases, passive and/or active migrations may be performed for one or more non-linked accounts. For example, passive and/or active migrations may be performed for one or more non-linked accounts for the purpose of creating additional capacity in a constrained data center or for maintenance purposes or any other appropriate purpose. In some cases, active migration techniques may be employed when instances need to be migrated quickly out of data center, while passive techniques may be employed when the need to migrate instances out of data center is not as immediate. In one example, placing a data center into the not mappable state described above may trigger a passive migration technique to be performed on each account that is assigned to that data center. The use of the not mappable state to trigger passive migrations is described in greater detail below with reference to FIG. 11.

Thus, a number of techniques for migration of instances for both linked and non-linked accounts are set forth in detail above. As described above, when applied to linked accounts, such migrations are used to consolidate each of the linked accounts together in a selected data center. An example process for linking multiple accounts across a logical zone will now be described in detail with reference to FIG. 10. Specifically, at operation 1010 a request is received to link multiple accounts. For example, as set forth above, a particular customer may wish to link together one or more separate accounts that are collectively owned by the customer. Some example advantages associated with linking of accounts are set forth in detail above.

At operation 1012, data center selection information is obtained. As set forth above, the data center selection information may include, for example, an identification of the data centers to which each of the linked accounts is currently assigned, linked account usage information, system capacity information and any other information that would be useful in determining a selected data center for the linked accounts. The data center selection information may include any combination of both current and/or historical information. Some examples of data center selection information are set forth in greater detail above.

At operation 1014, a selected data center is determined for the linked accounts. The selected data center may be determined based on results of the information obtained at operation 1012. The selected data center may be a data center to which one or more of the linked accounts are currently assigned or may be a different data center to which none of the accounts are currently assigned. The selected data center may be determined based upon one or more selection priorities, which may be set based on input from any combination of a customer, a service provider and/or another party. Such priorities may be employed in any appropriate combinations and may each be assigned any appropriate respective weights. Additionally, there are a number of other preventative factors that may weigh against or even eliminate a data center from consideration to be a selected data center. Some examples of data center selection priorities as well as preventative factors are set forth in greater detail above.

In some cases, the priorities, factors and other logic used to determine the selected data center may vary depending upon the results of data center selection information obtained at operation 1012. For example, in some cases, the results of data center selection information may trigger a determination of which combination of passive and/or active data migration techniques are to be employed in the linking process. The priorities, factors and other logic used to determine the selected data center may then vary depending upon the determined combination of passive and/or active migration techniques.

At operation 1016, any linked accounts not currently assigned to the selected data center will have instances migrated to the selected data center. As should be appreciated, in some cases, each of the linked accounts may already be assigned to the selected data center and no migration may be necessary. Depending upon factors such as the selected migration techniques and the status of the migrated accounts, migrations may be performed either within shorter time durations or more gradually over time. The migrations may be performed using any appropriate combination of passive and/or active migration techniques. Some example features of passive and active migration techniques are set forth in greater detail above. Additionally, an example procedure for performing a passive migration is described in detail below with reference to FIG. 11.

As should be appreciated, the selected data center for a family of linked accounts may be re-evaluated and possibly changed at any appropriate time. Such re-evaluation may occur, for example, each time that a new instance is launched and/or at regular intervals. Additionally, in some cases, such re-evaluation may occur, for example, when the currently selected data center reaches a threshold capacity, is placed in the not mappable state, needs to be drained of capacity or for any other appropriate reason. When the selected data center is changed, the migration of instances for necessary accounts at operation 1016 may be repeated as necessary.

Figure 10:
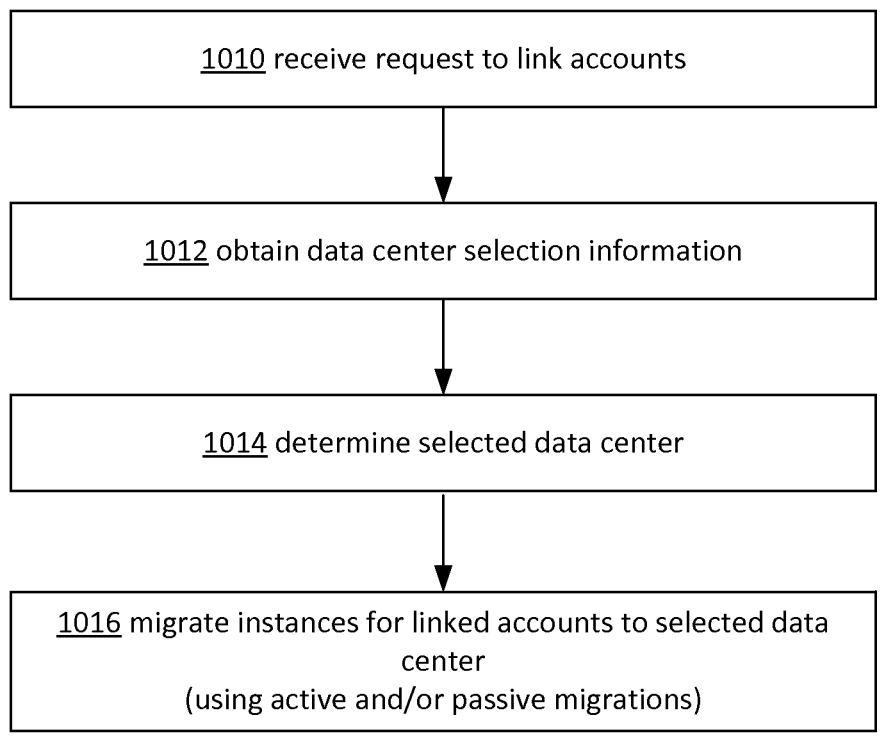
FIG. 10 is a flowchart depicting an example account linking procedure in accordance with the present disclosure.
Figure 11:
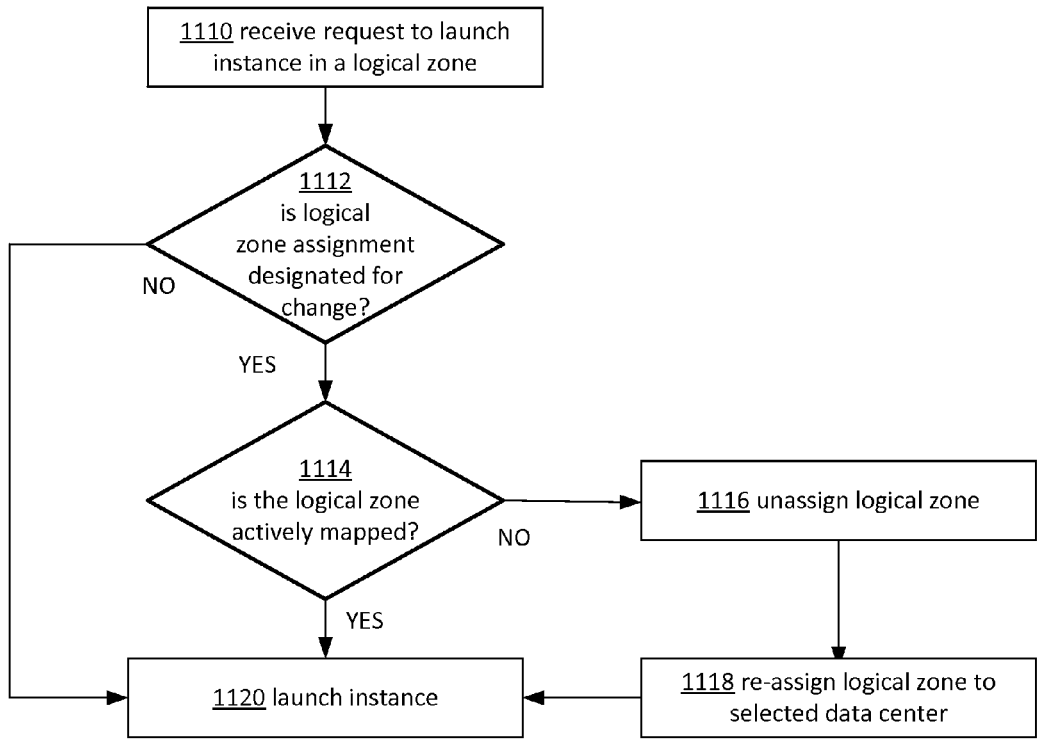
FIG. 11 is a flowchart depicting an example passive migration procedure in accordance with the present disclosure.

Referring now to FIG. 11, an example passive migration procedure will now be described in detail. Such a passive migration may, for example, be performed as part of an account linking process such as depicted in FIG. 10. As set forth above, however, a passive migration may be performed for both linked and non-linked accounts.

As shown in FIG. 11, at operation 1110, a request is received for a particular account to launch an instance in a particular logical zone. At operation 1112, it is determined whether the current logical zone assignment is designated for change. For example, a logical zone assignment may be designated for change when a linked account is not currently assigned to its selected data center. As another example, a logical zone assignment may be designated for change when a linked or non-linked account is currently assigned to a data center that has been placed in a not mappable state. As another example, a logical zone assignment may be designated for change when a customer requests to re-assign an account to a new data center with more remaining capacity than a current data center. A logical zone assignment may also be designated for change for any other appropriate reason.

If the current logical zone assignment is not designated for change, then, at operation 1120, the requested instance is launched in the data center to which the logical zone is currently assigned. If, on the other hand, the current logical zone assignment is not designated for change, then, at operation 1114, it is determined whether the logical zone is actively mapped. As set forth above, an account may be placed in an active mapping state based upon the occurrence of one or more mapping events. Additionally, an account may be expired from an active mapping state based upon the occurrence of one or more unmapping events. Mapping events may include, for example, launching of an instance within the logical zone. By contrast, unmapping events may include, for example, termination of all instances within the logical zone. Other example mapping and unmapping events, as well as other example aspects of the active mapping state, are set forth in greater detail above.

As set forth above, if the logical zone is not actively mapped, then it may be possible to re-assign the account from one data center to another with few, if any, negative consequences to the customer. Thus, if the logical zone is not actively mapped, then, at operation 1116, the logical zone is unassigned from its current data center, and, at operation 1118, the logical zone is re-assigned to a selected data center. The selected data center may be pre-selected or may be selected on-the-fly in response to, for example, un-assignment operation 1116. In particular, for linked accounts, the selected data center may be pre-selected as part of a linking process such as depicted at operation 1014 of FIG. 10. For non-linked accounts, the selected data center may be pre-selected or may be selected on-the-fly based on, for example, data center selection information such as described in detail above. After re-assigning the logical zone to the selected data center, the requested instance is launched at operation 1120. As should be appreciated, in some cases, even when an account is not in an active mapping state, an account may be prohibited from being re-assigned to a selected data center if, for example, the account has another logical zone that is already assigned to the selected data center.

As also set forth above, if a logical zone is actively mapped, then it may be more difficult to re-assign the account without negatively impacting the customer experience. Thus, if it is determined at operation 1114 that the logical zone is actively mapped, then, at operation 1120, the requested instance may be launched in the current data center even though that data center has been designated for change. In some cases, the launch of the requested instance may be blocked or delayed until the logical zone is expired from the active mapping state. Additionally, in some cases, an error message or other notification may be presented to the customer to inform the customer of a blocked instance or to ask the customer if the customer is willing to delay launching of the instance. Any other appropriate technique for delaying or blocking the instance until the logical zone is expired from the active mapping state may also be employed.

In addition to dynamic logical zone assignment of existing accounts, the disclosed techniques may also be applied to logical zone assignment of new accounts. In some cases, when a request is received for a new account to launch its initial new instance, a selected data center may be determined for the new account based on, for example, a remaining available capacity in each of the data centers and/or any number of other example selection priorities described above. Furthermore, in some cases, a new account or an additional pre-existing account may be added to an existing family of linked accounts. In these cases, the added account may, for example, be automatically assigned to the selected data center for the existing family of accounts. Also, in some cases, the adding of another account into an existing family of accounts may cause the family's selected data center to be re-evaluated and possibly changed.

Additionally, the disclosed techniques may be used to expire and change logical zone assignments for any number of individual or linked accounts at any appropriate time and for any appropriate reason. Such re-assignments may, in some cases, be performed regardless of whether or not any or all of the accounts are currently in an active mapping state. For example, in some cases, it may be determined that there is an urgent need to accounts out of a particular data center. In such cases, even if one or more of the accounts have active instances that are still launched within that particular data center, the assignments for those accounts may nevertheless be expired and the accounts may be re-assigned to a new selected data center. Such an expiration of assignments may, for example, be triggered based on a determination by the service provider and/or a customer request and may be based upon any of the example selection information described above or other appropriate information or logic.

The techniques set forth herein may be implemented by one or more components distributed across one or more computing devices in direct or indirect communication with one or more data centers and/or customer computing devices. Additionally, each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for consolidating virtual machine instance data within a logical zone across a plurality of accounts into a selected data center comprising:
   receiving a request to link the plurality of accounts, each linked account having an associated logical to physical assignment that assigns the logical zone to a data center;
   determining, based on one or more selection priorities, the selected data center to which to assign the logical zone for all of the linked accounts; and
   for each linked account for which the logical zone is assigned to a non-selected data center,
      receiving a request for the linked account to launch a new virtual machine instance in the logical zone;
      determining whether the linked account is actively mapped to the non-selected data center, wherein an active mapping is triggered by mapping events comprising launching a virtual machine instance within the non-selected data center, and wherein an active mapping is expired by unmapping events comprising terminating all virtual machine instances within the non-selected data center;
      when the linked account is not actively mapped to the non-selected data center, unassigning the logical zone from the non-selected data center, re-assigning the logical zone to the selected data center and launching the requested new virtual machine instance in the selected data center; and
      when the linked account is actively mapped to the non-selected data center, unassigning the logical zone from the non-selected data center after the active mapping has expired.

2. The method of claim 1, wherein the one or more selection priorities comprise selecting a data center based on at least one of a greatest number of assigned linked accounts, a greatest number of currently launched virtual machine instances, a longest estimated duration until termination of virtual machine instances or remaining capacity in one or more data centers.

3. The method of claim 1,
   wherein the mapping events further comprise creation of a block storage volume for a linked account within the logical zone and a request by a linked account to describe a spot price history, and wherein the unmapping events further comprise removal of the block storage volume for a linked account within the logical zone or a determination that a linked account has not issued a request to describe a spot price history within a specified time period.

4. The method of claim 1, further comprising, when the linked account is actively mapped to the non-selected data center, delaying launching of the requested new virtual machine instance until after the active mapping has expired such that the new virtual machine instance is launched in the selected data center.

5. One or more non-transitory computer-readable storage media having collectively stored thereon instructions that, upon execution by one or more processors of a computer system, cause the computer system to at least:

receive a request to link a plurality of sets of virtual machine instances, each linked set having an associated logical to physical assignment that assigns a logical zone to a data center that stores virtual machine instance data associated with the linked set;

determine, based on one or more selection priorities, a selected data center to which to assign the logical zone for all of the linked sets, wherein the one or more selection priorities comprise transferring virtual machine instances for a fewest number of linked sets; and for each linked set for which the logical zone is assigned to a non-selected data center, unassign the logical zone from the non-selected data center and re-assign the logical zone to the selected data center.

6. The non-transitory computer-readable storage media of claim 5, having further stored thereon instructions that, upon execution by the one or more processors of the computer system, cause the computer system to at least:

perform a transfer of virtual machine instances for at least one of the linked sets from a non-selected data center to the selected data center.

7. The non-transitory computer-readable storage media of claim 6, wherein the transfer is performed by terminating one or more virtual machine instances in the non-selected data center and launching one or more respective virtual machine instances in the selected data center.

8. The non-transitory computer-readable storage media of claim 7, wherein the transfer is performed on a collection of virtual machine instances in multiple stages by terminating and launching respective portions of the collection in each of the multiple stages.

9. The non-transitory computer-readable storage media of claim 6, wherein the one or more selection priorities further comprise at least one of transferring a fewest total number of virtual machine instances across all of the linked sets or transferring a least amount of data across all of the linked sets.

10. The non-transitory computer-readable storage media of claim 5, having further stored thereon instructions that, upon execution by the one or more processors of the computer system, cause the computer system to at least:

change the selected data center for one or more of the linked sets based on at least one of a customer request or a service provider determination to expire a logical to physical assignment.

11. The non-transitory computer-readable storage media of claim 5, having further stored thereon instructions that, upon execution by the one or more processors of the computer system, cause the computer system to at least:

receive a request to launch, in the logical zone, an initial virtual machine instance within a new set of virtual machine instances; and determine, based on one or more selection priorities, to assign the logical zone to the selected data center for the new set of virtual machine instances.

12. The non-transitory computer-readable storage media of claim 5, wherein, for each linked set for which the logical zone is assigned to a non-selected data center, the logical zone is unassigned from the non-selected data center and re-assigned to the selected data center in response to a determination that the linked set has no virtual machine instances executing within the non-selected data center.

13. A method for consolidating virtual machine instance data comprising:

receiving a request to link a plurality of sets of virtual machine instances, each linked set having an associated logical to physical assignment that assigns a logical zone to a data center that stores virtual machine instance data associated with the linked set;

determining, based on one or more selection priorities, a selected data center to which to assign the logical zone for all of the linked sets, wherein the one or more selection priorities comprise transferring virtual machine instances for a fewest number of linked sets; and transferring virtual machine instances for at least one of the linked sets from a non-selected data center to the selected data center.

14. The method of claim 13, wherein the transferring is performed by terminating one or more virtual machine instances in the non-selected data center and launching one or more respective virtual machine instances in the selected data center.

15. The method of claim 14, wherein the transferring is performed on a collection of virtual machine instances in multiple stages by terminating and launching respective portions of the collection in each of the multiple stages.

16. The method of claim 13, wherein the transferring is performed based on a determination that one or more of the linked sets are estimated to require longer than a threshold time duration in order to terminate all virtual machine instances in the logical zone.

17. The method of claim 13, wherein the one or more selection priorities further comprise at least one of transferring a fewest total number of virtual machine instances across all of the linked sets or transferring a least amount of data across all of the linked sets.

18. A computing system comprising one or more processors and one or more data stores in communication with the one or more processors, the one or more data stores having stored therein instructions that, upon execution by the one or more processors, at least cause the computing system to:

receive a request to link a plurality of sets of virtual machine instances, each linked set having an associated logical to physical assignment that assigns a logical zone to a data center that stores virtual machine instance data associated with the linked set;

determine, based on one or more selection priorities, a selected data center to which to assign the logical zone for all of the linked sets; and for each linked set for which the logical zone is currently assigned to a non-selected data center:

unassign the logical zone from the non-selected data center in response to a determination that the linked set has no virtual machine instances executing within the non-selected data center; and re-assign the logical zone to the selected data center.

19. The computing system of claim 18, wherein the one or more selection priorities comprise selecting a data center based a greatest number of assigned linked sets.

20. The computing system of claim 18, wherein the one or more selection priorities comprise selecting a data center based on a greatest number of currently launched virtual machine instances.

21. The computing system of claim 18, wherein the one or more selection priorities comprise selecting a data center based on a longest estimated duration until termination of virtual machine instances.

22. The computing system of claim 18, wherein the one or more selection priorities comprise selecting a data center based on available remaining capacity in one or more data centers.

23. The computing system of claim 18, wherein the selected data center is determined based on current and historical information.

\* \* \* \* \*